Sept. 29, 1931.          G. TADGELL          1,825,560
LOCKING MEANS FOR STRINGED INSTRUMENT TUNING PINS
Filed Aug. 4, 1930
Fig.1.
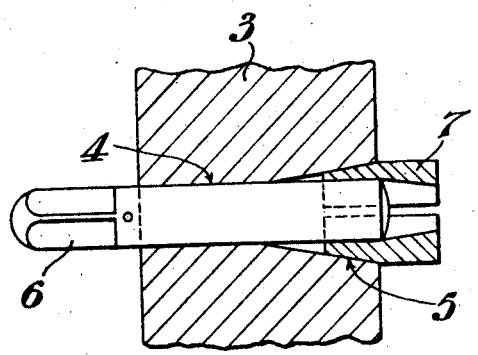
Fig.2.        Fig.3.
   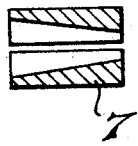
INVENTOR
GEORGE TADGELL Patented Sept. 29, 1931

1,825,560

UNITED STATES PATENT OFFICE

GEORGE TADGELL, OF TOTTENHAM, ENGLAND

LOCKING MEANS FOR STRINGED INSTRUMENT TUNING PINS

Application filed August 4, 1930, Serial No. 472,968, and in Great Britain August 8, 1929.

This invention concerns tuning pins for stringed musical instruments, and more especially tuning pins of pianofortes.

Although tuning pins of plain, simple form, serrated, if necessary, can be used in a wooden plank, instrument head or the like and will be gripped, due to the inherent softness of the wood, in such a manner as to keep the strings in tune, it has been found imprac10 ticable to use such a pin in connection with metal frames, instrument heads or the like as the pin will not properly wedge in a hole made therefor, sufficient to retain the string in tune, and accordingly it has been neces15 sary to use pins of special forms which, in most cases, have resulted in increased production costs.

It has heretofore been proposed to surround the pin with a split metal collar, the wall of which is of gradually increasing thickness from end to end; said collar constituting a tapered bushing to be driven into the hole in the metal frame to grip the tuning pin by the wedge action thus produced and this known feature also is embodied in the present invention.

In the prior instance mentioned, however, the bush or collar was designed to pass completely through the thickness of the frame, and the hole in the frame accordingly was of tapered formation throughout its full length. I have found it desirable after initial insertion of the collar to insert the pin and locate same to occupy the correct position, and finally drive home the collar, but if the tapered formation and necessary enlargement of the hole for the collar reception is carried completely through the frame or equivalent, the pin is not properly held when driving home the collar owing to the considerable play, and the subsequent driving in of the collar is certain to displace the pin.

With a view to overcoming this defect, I form the frame or like hole, for part of its length, of cylindrical form and of a diameter such that the pin has a close working fit therein by direct contact therewith. and the hole is tapered for the remainder of its length to receive the collar, which latter extends only part-way through the thickness of the frame or its equivalent. The intimate contact of the pin with the hole produces sufficient resistance to prevent the pin being driven out when the collar is driven home.

In the case of each pin-receiving hole, the tapered portion thereof is disposed at the rear so that the split collar is inserted from the back of the frame or the like, said collar being introduced thin end foremost. Said collar, which, being split, can contract as necessary, is adapted to surround the tuning pin, which latter can be subsequently inserted, a suitable block (such as a metal or metal-faced block) being placed up against the collar to prevent same being forced out while stringing, and it will be understood that driving in of the collar as far as necessary into the hole will result in the desired increased grip on the pin.

Preferably, the varying thickness of the metal collar is produced by varying the internal diameter thereof although alternatively or in addition the outside diameter thereof may be varied.

My invention, as above described, permits of a plain-surfaced pin being used instead of a more costly serrated pin, and, moreover, a somewhat shorter pin can be used with advantage. The instrument will remain in tune longer than obtains in present practice, and the invention is eminently suitable for use in hot climates, as the grip of the pin will not be affected by varying climatic conditions.

The pin, collar, and pin-receiving hole are treated with enamel to produce a smoothness of movement during the tuning process, and to prevent rusting.

In order that my said invention may be the more readily understood, reference is directed to the accompanying drawings illustrating a practical embodiment thereof, and wherein:—

Figure 1 is an enlarged sectional view through a piano frame with my invention embodied; and, Figure 2 is an end view of the collar provided; and, Figure 3 is a longitudinal section through said collar.

Referring to the drawings, reference 3 represents the piano frame and 4 one of the tuning-pin holes made therein, each of which, as shown, has a tapering mouth 5 opening out at the back of the frame, the taper commencing about half-way along the length of the hole. The space formed by said tapering mouth around the tuning-pin 6 serves for the reception of a split collar 7, the wall of which is wedge-shape in longitudinal section. Said wedge is introduced thin end first as stated, and driven as far as necessary into the conical mouth 5, during which operation it will contract and produce the desired pressure on the tuning-pin 6.

I claim:—

In a stringed instrument, a member having a hole therein for the reception of a tuning pin, said hole extending through the member and being cylindrical throughout a portion of its length and throughout the remaining part of its length being inwardly tapered from one side of the member to said cylindrical portion, a cylindrical tuning pin neatly fitting the cylindrical portion of said hole and extending into the tapered portion thereof, said pin having a smooth exterior surface and the wall of said hole being smooth, and a split collar disposed in the tapered portion of said hole in embracing relation to said pin, said collar having a tapered exterior face corresponding to and frictionally seated against the wall of the tapered portion of said hole and also having a cylindrical bore corresponding in diameter substantially to the diameter of the tuning pin, the wall of said bore frictionally engaging the pin.

In testimony whereof I have affixed my signature hereto this 25th day of July 1930.

GEORGE TADGELL.